United States Patent [19]
Thomas et al.

[11] Patent Number: 5,818,718
[45] Date of Patent: Oct. 6, 1998

[54] HIGHER ORDER CONSTRUCTION ALGORITHM METHOD FOR RAPID PROTOTYPING

[75] Inventors: Charles L. Thomas; Cheol H. Lee; Srinivas Kaza; Thomas M. Gaffney, all of Salt Lake City, Utah

[73] Assignee: University of Utah Research Foundation, Salt Lake City, Utah

[21] Appl. No.: 625,142

[22] Filed: Apr. 1, 1996

[51] Int. Cl.⁶ .................................................. G06F 19/00
[52] U.S. Cl. ....................................................... 364/468.26
[58] Field of Search ........................... 364/468.25, 468.26

[56] References Cited

U.S. PATENT DOCUMENTS

| | | | |
|---|---|---|---|
| 4,665,492 | 5/1987 | Masters | 364/468 |
| 5,121,329 | 6/1992 | Cyump | 364/468 |
| 5,253,177 | 10/1993 | Saito et al. | 364/468 |
| 5,287,435 | 2/1994 | Cohen et al. | 364/468 |
| 5,398,193 | 3/1995 | de Angelis | 364/468 |
| 5,432,704 | 7/1995 | Vorzelard et al. | 364/468 |
| 5,506,607 | 4/1996 | Sanders, Jr. et al. | 364/468 |
| 5,510,066 | 4/1996 | Fink et al. | 364/468 |

*Primary Examiner*—James P. Trammell
*Attorney, Agent, or Firm*—Trask, Britt & Rossa

[57] ABSTRACT

A rapid prototype modeling system operates to first electronically decompose a discrete part represented by an STL file into electronic layers, using a paradigm characterized by a higher than zero order of fit with respect to the surface of the part. Physical layers are generated from the electronic layers by mechanical devices constructed and arranged to operate in accordance with the paradigm. The physical layers are then stacked appropriately to create a physical model of the discrete part.

14 Claims, 9 Drawing Sheets

HIGHER ORDER CONSTRUCTION ALGORITHM METHOD FOR RAPID PROTOTYPING

MICROFICHE APPENDIX

This application includes a computer program listing printout submitted in the form of a microfiche appendix as provided by 37 CFR 1.96 (b). The appendix consists of a single microfiche with a total of 84 frames.

BACKGROUND

1. Field

This invention relates to rapid prototype modeling techniques. It is particularly directed to the use of higher order algorithms for the construction of solid prototype parts derived from 3D CAD software-generated models.

2. State of the Art

To remain competitive in a global market, manufacturers are called upon to bring a variety of products to market with continually decreasing lead times and development costs. These commercial realities are a driving force demanding the development of improved rapid prototyping techniques.

A rapid prototyping technique (RP) is considered for purposes of this disclosure to include any automatic technique for producing a solid three dimensional object from a computer assisted drawing (CAD) representation of the object. RP systems typically require minimal skill and interaction on the part of the operator. Most RP systems are quite flexible, allowing the creation of practically any shape the designer can imagine. RP thus inherently allows the creation of models that are difficult or impossible to construct by other techniques. While there exist significant differences between RP systems, RP generally produces parts that fit within a build volume of less than about a cubic meter (typically a third of a cubic meter), builds these parts at a rate of approximately one vertical inch per hour, and normally provides an accuracy within the range of about 0.2%–0.5% of model dimensions, with a lower limit of 0.005". The cost for a part from an RP service bureau ranges up to several thousand dollars for a part that fills the build volume.

RP techniques are useful for producing small parts, such as disk drive cases, telephone hand sets, piston rods and the like. However, if the part to be prototyped is large; e.g., a car, the wing of an aircraft, or the support housing for a commercial power generator, the part must be generated in pieces, and the pieces then assembled. The resulting part typically requires days to construct, and its cost of construction is proportionately very high.

The paradigm currently used by most RP techniques has a limited range of applicability. Parts larger than one cubic centimeter and smaller than one cubic meter are efficiently produced. Outside this range, prototypes either lose accuracy, or become expensive and time consuming to construct.

Most RP techniques that are currently in use operate under a common construction paradigm. Working from a stereolithography format, faceted approximation of the solid model, the model is first decomposed into a series of parallel cross sections spaced at a distance equal to the eventual thickness of the construction layers. The part is then constructed by generating these layers from some solid material, and bonding the layers together. The cross sections are physically realized by means of a construction technique characteristic of the specific RP system utilized.

There are several commercially available rapid prototyping processes, each using a unique production process for creating prototype models. A few of the more popular rapid prototyping techniques are Stereolithography (SLA), photo exposure layering (PEL), laminated object manufacturing (LOM), selective laser sintering (SLS), and fused deposition modeling (FDM). SLA-based systems solidify each layer from liquid photopolymer. LOM-based systems cut each layer from a sheet material. SLS-based systems fuse layers of powder into each cross section shape. These techniques construct each layer with essentially vertical edges, creating a generalized cylinder. For purposes of this disclosure, they are considered to rely upon the "vertical cylinder paradigm" (VCP). These vertical cylinders result in a stepped profile in a prototype representing a part that does not in fact have vertical edges. VCP produces a good representation of objects that have only vertical surfaces in at least one axis. The accuracy of the representation decreases as the surface shape becomes more general and the layer thickness employed increases.

An example of an alternative paradigm currently in use for RP applications is in the "Protoform" software produced by Pentari. The operating paradigm used by Protoform is referred to in this disclosure as the "flat pattern paradigm" (FPP). By this RP system, a solid model is tessellated into flat polygon surfaces and then unfolded into a flat pattern. Tabs are generated at the cut edges, and the resulting pattern is plotted. The pattern is cut, folded, and tabs are joined, creating a three dimensional object. RP using FPP produces only the surface of an object, thereby requiring very little construction material. Accurate representations of curved or domed surfaces require very small tessellations, which are difficult to create. Thus, a relatively crude approximation is produced by this approach applied to non-planar surfaces.

While each of the current RP systems is useful, each has at least one significant limitation. Some general examples of these limitations include: large procurement cost, expensive prototype production costs, and the use of resins and polymers that produce harmful gasses. Most importantly, all of them are limited to build volumes of less than about a cubic meter, and in some cases less than a cubic foot.

As presently understood, merely modifying existing RP machines would not enable effective operation significantly outside the currently available manufacturing envelope. Making vertical cylinders faster could presumably expand the envelope, but an RP machine that is efficient for producing 10 cm prototypes cannot be expected efficiently to produce 10 meter prototypes. There remains a need for an RP system capable of expanding the build volume of current systems. Moreover, in the construction of large objects, it would be preferable to operate within construction paradigms capable of realizing a closer fit between the prototype and the design part.

SUMMARY OF THE INVENTION

This invention provides an RP system which avoids many of the limitations of existing systems. It expands the build volume of prototype parts through the use of higher order paradigms. It also provides a system, including machine components, capable of implementing software such as that of the microfiche appendix.

Viewed broadly, a rapid prototype system of this invention comprises the steps of electronically decomposing an electronic model of an object into a first series of electronic layers in accordance with a paradigm characterized by a higher than zero order fit with respect to the surface of said object; generating a second series of physical layers from a construction material by mechanical means constructed and arranged to operate in accordance with that paradigm, the second series corresponding layer by layer to the first series; and constructing a physical prototype of the object by assembling the physical layers.

The mechanical means for practicing the invention is structured and arranged to provide four degrees of freedom in positioning a cutting device with respect to sheets of construction material. The mechanical means is generally constructed and arranged to accept and manipulate sheets of construction material four feet wide, or more, and is operated by control means responsive to software equivalent to that of the appendix.

The mechanical means generally includes support structure, operable to move a sheet of construction material forwards and backwards along a travel path in a plane; an electronically heated wire with a first end held by a first linear positioning device and a second end held by a second linear positioning device, the first and second positioning devices being supported to position the wire transverse the plane to intersect and cut a sheet of construction material traveling on the support structure; first structure, mounting the first positioning device such that it may travel back and forth transverse the travel path; second structure, mounting the second positioning device such that it may travel independently of the first positioning device back and forth transverse the travel path; and electronic control means, responsive to operating software, for controlling the relative movements of a sheet of construction material on the support structure, the first positioning means and the second positioning means. The mechanical means may also include heat control means, responsive to the operating software, constructed and arranged to adjust the temperature of the wire. The operating software is ideally equivalent to that of the appendix.

According to this invention, a rapid prototype modeling system operates to first electronically decompose a discrete part represented by an STL file into electronic layers, using a paradigm characterized by a higher than zero order of fit with respect to the surface of the part. Physical layers are generated from the electronic layers by mechanical devices constructed and arranged to operate in accordance with the paradigm. The physical layers are then stacked appropriately to create a physical model of the discrete part.

In practice, an electronic model of an object is electronically decomposed into a first series of electronic layers in accordance with a paradigm characterized by a higher than zero order fit with respect to the surface of the object. A second series of physical layers is generated from a construction material, the second series corresponding layer-by-layer to the first series. This second series of physical layers is generated by mechanical means constructed and arranged to operate in accordance with the paradigm relied upon for decomposing the electronic model. A physical prototype of the object is then constructed by assembling the physical layers. The paradigm has a higher order of fit than that of the vertical cylinder paradigm (VCP) common to RP. It may be selected from either the trapezoidal cylinder paradigm (TCP) or the arc cylinder paradigm (ACP), although other higher order construction algorithms (HOCA) are operable.

In mathematical terms, VCP is considered to produce a zero order curve fit to the model surface at the edge of each layer. By increasing the order of this fit, this invention produces a more accurate representation at the same layer thickness, and/or increased speed of construction at no less accuracy by increasing the thickness of the construction layers.

A principle similar to that of the trapezoidal rule, often used in numerical integration, is applied by this invention to the construction of layered parts, thereby producing a first order curve fit at the layer edge. To apply this trapezoidal cylinder paradigm (TCP), an electronic model is first decomposed into a series of cross sections in conventional RP fashion. Rather than reconstructing each layer based on information from a single cross section, however, the layer is constructed as a linear blend between two consecutive cross sections. A slice taken vertically through this reconstructed layer would produce a trapezoid. Thus, these layers can be considered generalized trapezoidal cylinders. While VCP allows reconstruction of vertical-edged parts with very little error, the trapezoidal cylinder paradigm (TCP) additionally allows reconstruction of parts from models generated with ruled surfaces with very little error. Modeling of double curved surfaces by TCP will still produce error, but much less error than by VCP.

This invention alternatively applies an arc cylinder paradigm (ACP), whereby a variable radius arc is fit to the edge of a layer. This curve fit is essentially of second order at the layer edge. Layers produced using ACP can be considered generalized cylinders with concave or convex curved edges. The radius of curvature will generally vary with position along the edge, possibly transitioning from convex to concave on a single layer. An algorithm is required to select the radius that will minimize the error between the model and the reconstructed layer.

It is within contemplation to utilize paradigms using even higher order curve fits for layer edges. For example, by requiring the surface gradient at the edge of adjoining layers to be equal, a reconstructed part will be characterized by a smooth transition from layer to layer. A higher order version of the FPP would further enhance the reconstruction of curved surfaces.

This invention contemplates the design and implementation of rapid prototyping devices using higher order construction algorithms (HOCA) for use in rapid prototyping of large scale master models. Examples of practical applications include full scale models of automobiles, boat hulls, wind turbine air foils, or molds for use with room temperature layup of composites. Lost foam casting and other conventional casting techniques may be used to convert large polystyrene foam models into metal castings.

A specific embodiment of this invention utilizes TCP to build prototypes from "trapezoidal disks". TCP creates linear interpolation between the upper and lower cross sections which define one layer or slice of a CAD model being constructed. The height of each trapezoid is equal to the thickness of material used to construct the prototype model. By using thick layers, construction time for the overall model is significantly reduced. It is practical, for example, to cut layers from 4 ft×8 ft×1 inch thick polystyrene foam insulation boards. Stacking and bonding of the layers may be done manually or by automated systems.

BRIEF DESCRIPTION OF THE DRAWINGS

In the drawings, which illustrate what is currently regarded as the best mode for carrying out the invention.

DESCRIPTION OF THE ILLUSTRATED EMBODIMENTS

Figure 1:
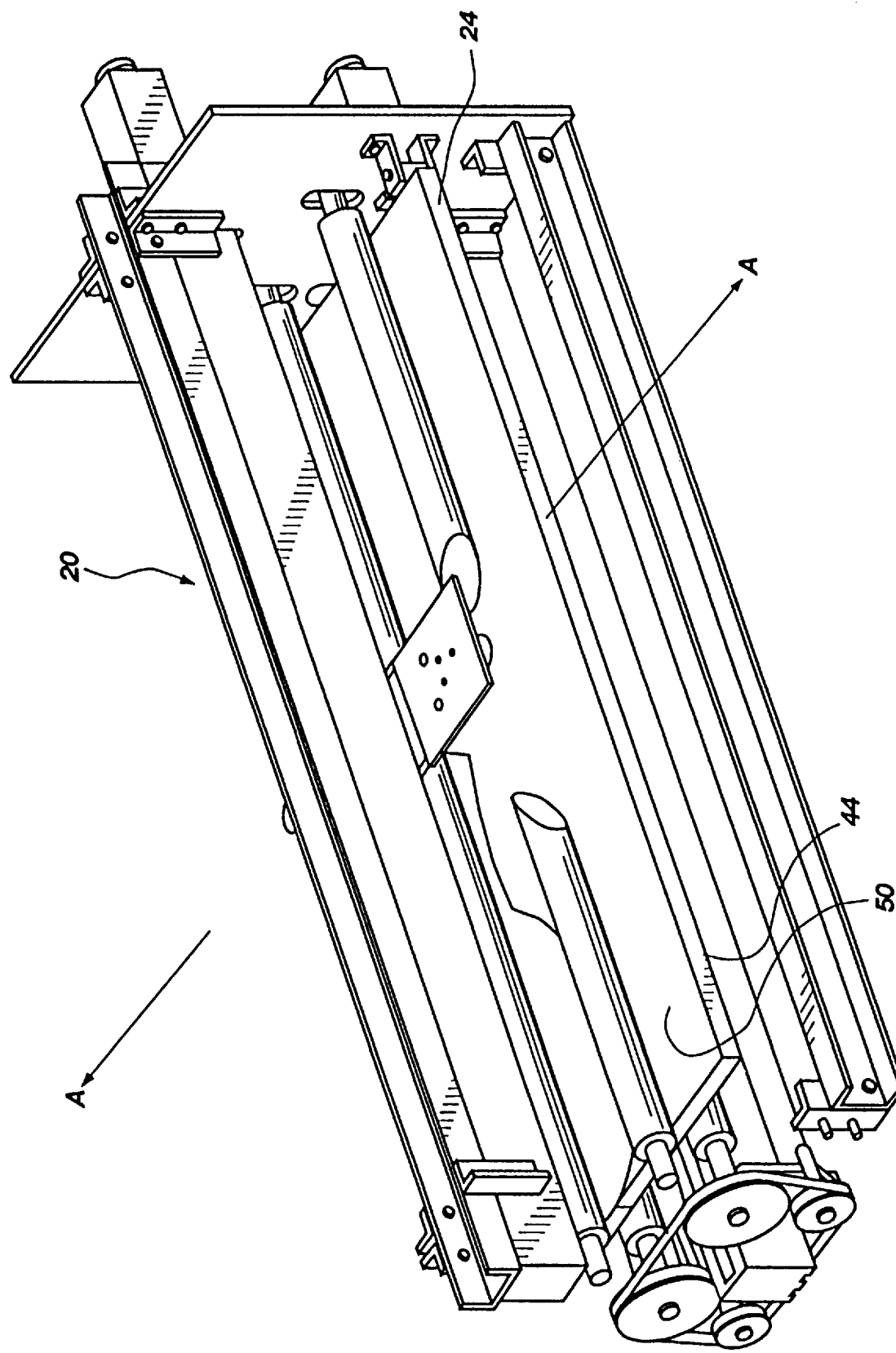
FIG. 1 is a pictorial view of a machine embodying the invention, with an end plate removed to permit better visibility of components.

As illustrated by FIG. 1, a machine of this invention, designated generally 20, may utilize an electronically heated wire 22 (FIGS. 2 and 3) to cut rigid sheets 24. The sheets 24 are manipulated in a forward or reversed direction along a selected travel axis, A—A, atop horizontal drive rollers 26, 28. Above each drive roller is a free floating nip/idler roller 30, 32 to ensure contact between the drive rollers 26, 28 and the foam sheet 24.

Figure 2:
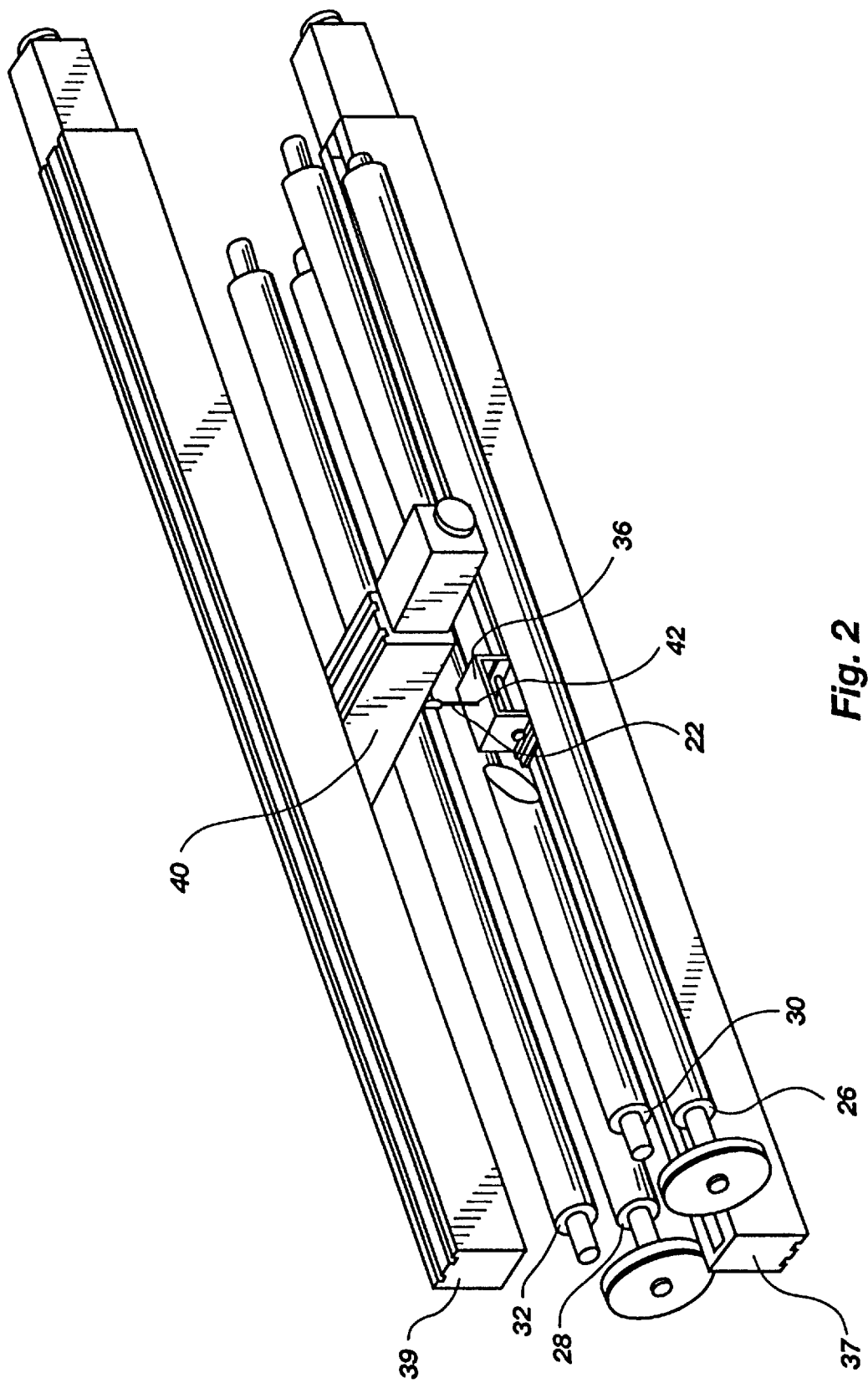
FIG. 2 is a fragmentary view of the machine of FIG. 1, illustrating components which manipulate the positions of a sheet of construction material and a cutter.
Figure 3:
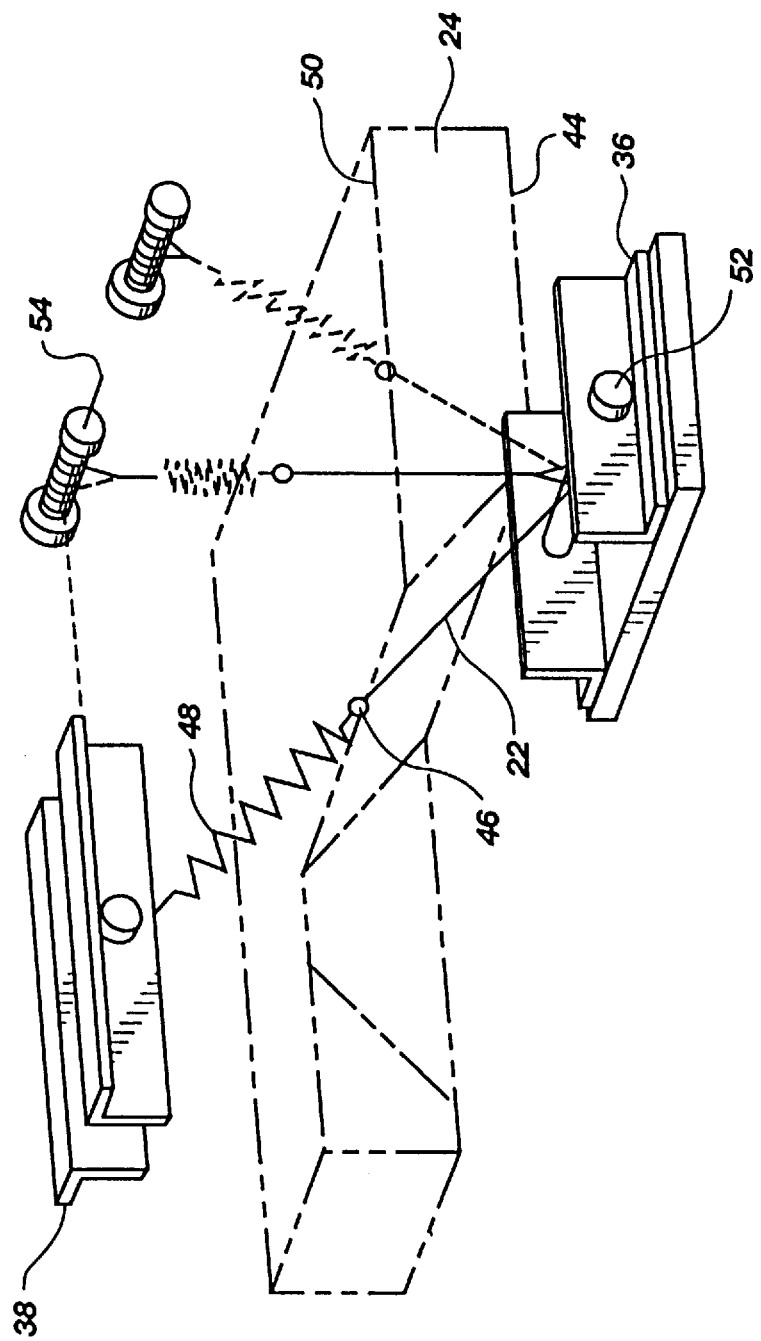
FIG. 3 is a fragmentary view of components of a cutting assembly of the machine of FIG. 1, illustrating alternative orientations of a cutter wire.

The heated wire 22 is shown by FIG. 2 positioned transverse the sheet 24 approximately vertically. The attitude of the wire 22 with respect to vertical transverse the travel axis A—A may be adjusted as illustrated by FIG. 3, through the relative positioning of a first linear positioning device 36, mounted to travel along a first, lower rail 37 and a second linear positioning device 38, mounted to travel along a second, upper rail 39 approximately parallel the first rail 37. As best shown by FIG. 2, the attitude of the wire 22 with respect to vertical parallel the travel axis A—A is adjustable by means of a third linear motion device 40, mounted to travel approximately normal the second rail 39. In operation, the linear motion devices 36, 38, 40 are driven in coordination with the manipulations of the sheet 24 along the axis A—A. Motion control for each linear positioning device 36, 38, 40, as well as for the drive rollers 26, 28 is supplied by stepper motors (not shown), which receive input signals from a software control program (appendix).

The combination of these three motion devices 36, 38, 40 provide the illustrated mechanism 20 three degrees of freedom. The powered drive rollers 26, 28 feed the construction sheet 24 into the cutting wire 22, thereby contributing a fourth degree of freedom.

Operation of the illustrated device is similar to the operation of a roll plotter, but with an additional two degrees of freedom in an x-y coordinate system. The drive rollers 26, 28 and lower linear motion device 36 act in the fashion of a roll plotter to position the base 42 of the cutting wire anywhere on the bottom surface 44 (FIG. 3) of the foam sheet 24. The upper two linear motion devices 38, 40 add two more degrees of freedom, allowing the upper end 46 (FIG. 2) of the cutter wire 22 to be positioned independently of the lower end 42.

The respective ends 42, 46 of the electrically heated cutting wire 22 are directly attached to two of the three independent linear motion devices 36, 38. A coil spring 48 connects the upper end 46 of the cutting wire 22 to the device 38. The coil spring 48 accommodates length adjustments required of the wire 22 as it is positioned for making linearly interpolated cuts at an angle from the vertical plane. Temperature of the wire 22 is adjusted by varying the electric current applied to it. The cutting speed is adjusted to minimize cutter deflections caused by the construction material, in the illustrated instance, foam plastic board 24.

The main tasks of the machine control software of the appendix are to recognize coordinates representing a CAD 3D solid object, and to find a sequence of cutter motions to produce the required cross sectional slices. Once an object is created in a CAD system, it can be easily saved in STL format, the file format currently utilized for many RP techniques. In selecting an STL file format, it should be recognized that the accuracy of an approximated object saved in the STL file is the maximum accuracy that the prototype machine will be able to produce. The machine uses geometry information saved in the STL file, not the CAD drawing file. The invention applied to files of greater accuracy will produce more accurate prototypes. Algorithms that generate cross sections directly from the CAD model are within contemplation.

After reading an STL file, the control software regenerates the object on a computer screen. A user may then determine the most efficient slice direction by rotating, transforming, and scaling the object on screen. The software then slices the object into layers equal to a selected material thickness, and defines straight line segments which represent the edges of the object on the cut plane. The end result of this slicing algorithm is a series of independent cross sections.

For the actual part layers to be cut, it is necessary to define synchronized positionings of the cutter wire 22. The cutter wire 22 must be repositioned over time, in coordination with movements of a layer 24 of construction material, to produce somewhat different cross-sectional configurations at the upper 50 and lower 44 surfaces of the layer 24 in a simultaneous coordinated motion. Defining the cutter path involves optimally matching points on the perimeters of the top and bottom surface cross sections of a slice. Cutter paths are generally determined by matching each top cross section point with the closest bottom cross section point. This distance minimization approach is generally suitable because it can accommodate virtually any shape. This technique can thus generate thick slices with small error, and is suitable for prototyping large objects rapidly.

Figure 4:
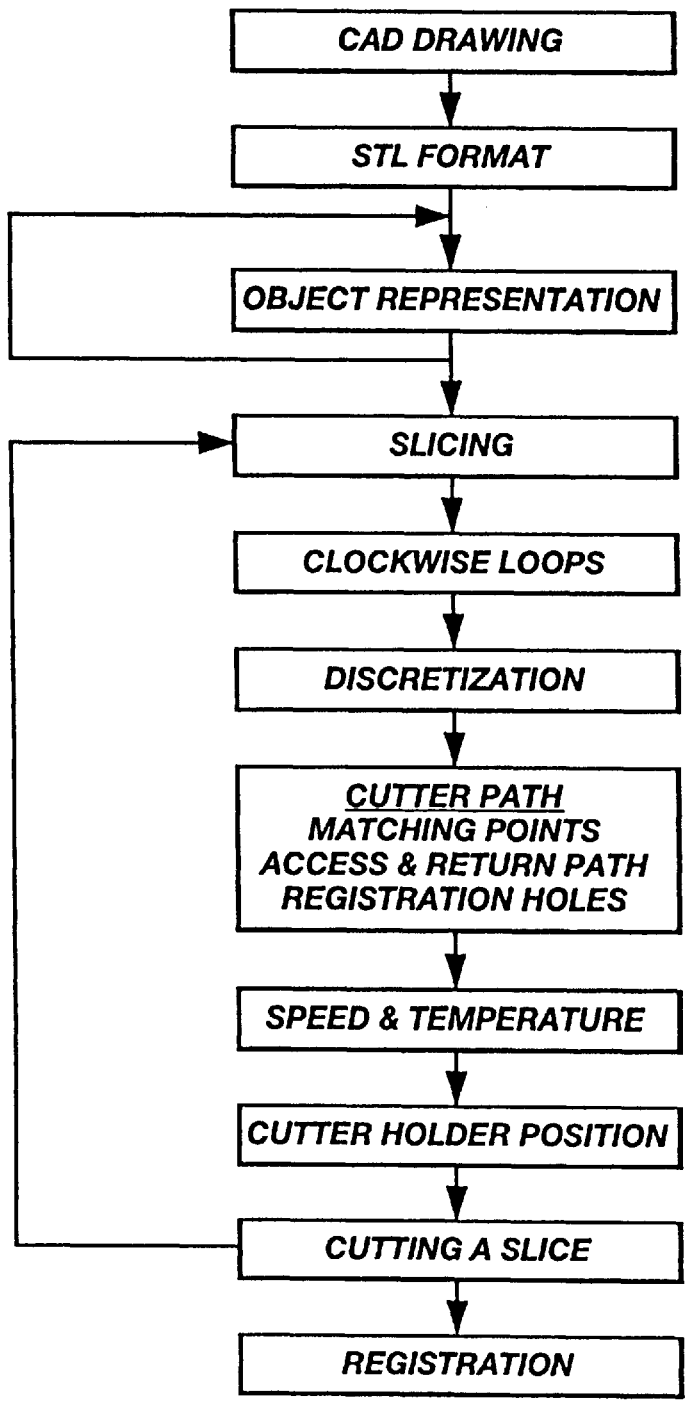
FIG. 4 is a flow diagram of the method of this invention.

The defined cutter path corresponds to respective cutting paths on the upper and lower surfaces of a construction sheet 24. The actual hot wire 22 extends beyond the upper 50 and lower 44 surfaces and pivots about points associated with anchor rods 52, 54 displaced significantly above and below those surfaces. Accordingly, after finding cutter paths, the software calculates the appropriate positions of the respective cutter pivot points to trace the proper cutter path on the material. Finally, the software converts position coordinates into a string of pulses to drive the stepper motors. A flow chart for the complete algorithm is presented by FIG. 4.

Ideally, the cutting machine should be constructed and arranged to have a pen up function. The machine is then capable of moving the cutter device from point to point without cutting material, thereby avoiding the need for the layout of access paths to loops and return paths to a home position. When a large object is built, registration of slices is an important concern. Adding paths and holes for registration can be done by the software following rules defined by the user.

Two main parameters controlling the quality of the cut surface are cutter speed and temperature. Speed is defined by the pulse rate sent to the stepper motors which is related to the torque of the motors. The cutter temperature is a function of electric current going through the cutter wire 22. Undesirable combinations of speed and temperature can result in local areas where the cutter melt radius becomes excessive. Cutting too fast or too cool results in excessive deflection of the hot wire which also reduces accuracy. Optimal combination of these parameters depends on material properties and the characteristics of the object geometry, and will generally be determined through careful experiments. It has been observed that maintaining a constant speed and temperature over the working period is beneficial.

EXAMPLE 1

Figure 5:
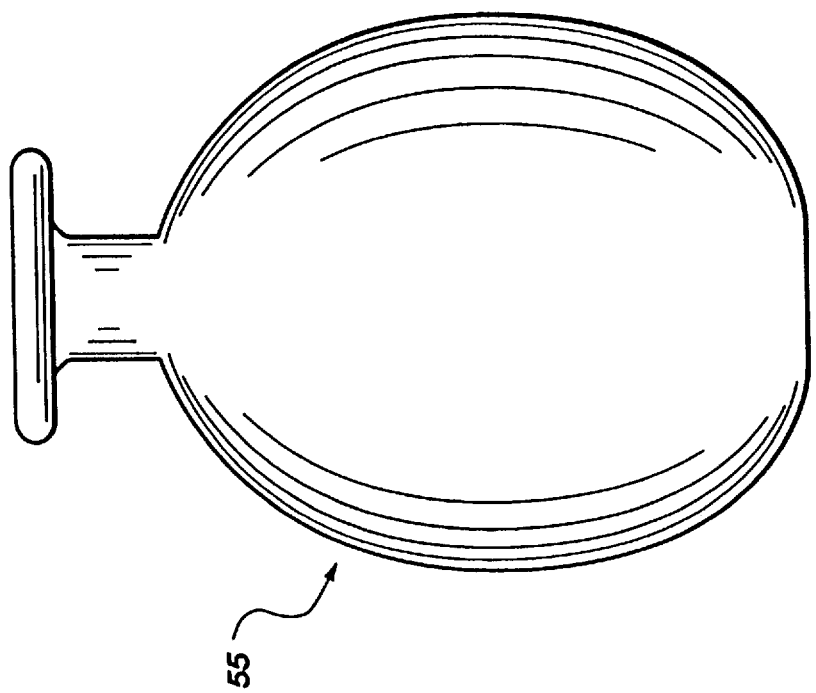
FIG. 5 is an illustration of an electronic model of a vase.

A simple vase 55 (FIG. 5) was designed to test construction accuracy as a function of layer thickness for the construction paradigms: VCP, TCP, and ACP. Under the assumption that the speed of construction of a layer is independent of layer thickness, it follows that parts built with thicker layers will require less time to construct.

The vase shape may be represented mathematically, using a series of two dimensional (x,y) arcs and lines that are revolved about the y axis:

| Vertical Dimension (y) | Equation |
|---|---|
| Outer Surface: | |
| 0–28 | $\frac{(x-3)^2}{100} + \frac{(y-15)^2}{225} = 1$ |
| 28–30 | $3x + 5y = 164$ |
| 31–35 | $x = 3$ |
| 35–36 | $(x - 4)^2 + (y - 35)^2 = 1$ |
| 36–38 | $(x - 6)^2 + (y = 37)^2 = 1$ |
| Inner Surface: | |
| 0–3 | $x = 0$ |
| 3–28 | $\frac{x^2}{100} + \frac{(y-15)^2}{225} = 1$ |
| 28–30 | $2x + 3y = 94$ |
| 30–35 | $x = 2$ |
| 35–37 | $(x - 4)^2 + (y = 35)^2 = 4$ |
| 37–38 | $(x - 4)^2 + (y = 38)^2 = 1$ |

Figure 7:
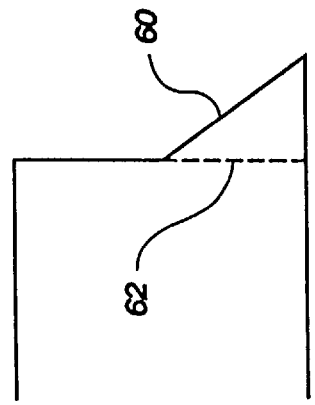

For this simple shape, as can be seen from FIG. 7, all cross sections are either solid circular cylinders 56 or solid circular annuli 58, and a specific cross section is completely defined by one or two coordinates on the x axis. To apply VCP, an algorithm is needed to select the x coordinates for each layer (one or two numbers). For TCP, each layer requires x coordinates for the upper surface and the lower surface (two or four numbers). ACP requires x coordinates for upper and lower surfaces along with one or two radii (three or six numbers). The algorithms used in this example for each paradigm were:

VCP

The radius of each layer is forced to match the model at the top of each layer.

TCP

The algorithm for TCP utilizes the cross sections generated for VCP. The top cross section for a given layer is identical to the bottom layer of the closest layer above it.

ACP

Arc cylinders are generated from the cross sections generated for VCP. The arc radius is generated by passing an arc through the upper surface point, the lower surface point, and a third point that lies on the model surface at the midpoint of the layer. Implementation was as follows:

1) identify the x coordinate for a new cross section in the center of the layer.
2) define a line segment from the upper surface to the center and a second from the lower surface to the center.
3) The bisecting normals of these line segments intersect at the center of curvature, identifying the radius.

Figure 6:
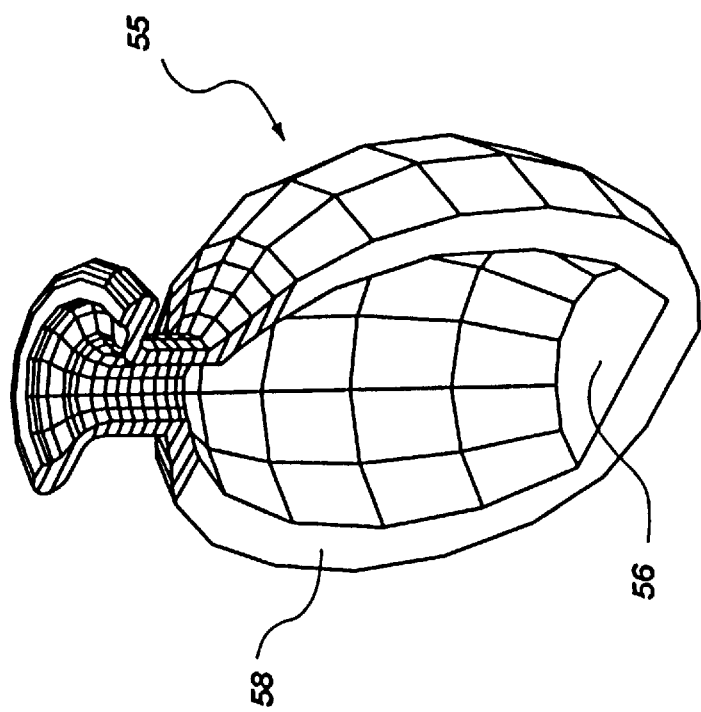
FIG. 6 is a fragmentary illustration of the model of FIG. 5 decomposed into electronic layers.
Figure 9:
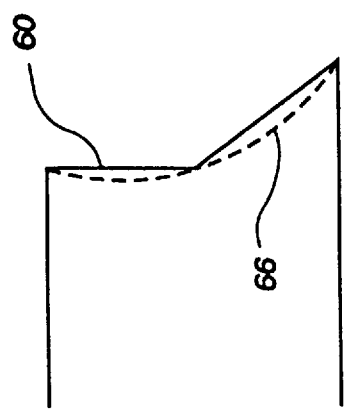
FIGS. 7, 8 and 9 are diagrammatic illustrations of the respective fits with respect to a layer surface offered by VCP, TCP and ACP paradigms in accordance with the invention.
Figure 8:
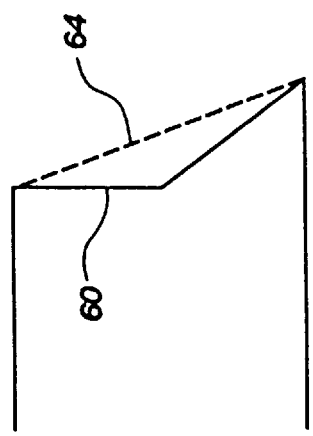

The fits of these construction algorithms are shown schematically in FIGS. 7, 8 and 9, respectively. The accuracy of each algorithm was measured by calculating the error between the volume of material required by the exact model, represented by the solid line 60, and that required by the reconstructed model, represented by the broken lines 62, 64 and 66, respectively. First, the exact volume of the mathematical model for the vase was calculated. Next, the model was decomposed into layers (FIG. 6), and the volume of the combined layers was calculated. This procedure was performed for each algorithm, varying layer thickness from 0.1 mm to 2 mm. The percent error associated with a given algorithm and layer thickness was calculated by:

$$\% \text{ Error} = \left( \frac{V_0 - V_{rc}}{V_0} \right) 100$$

where $V_0$ is the volume of the mathematical model and $V_{rc}$ is the volume of the reconstructed model.

Figure 10:
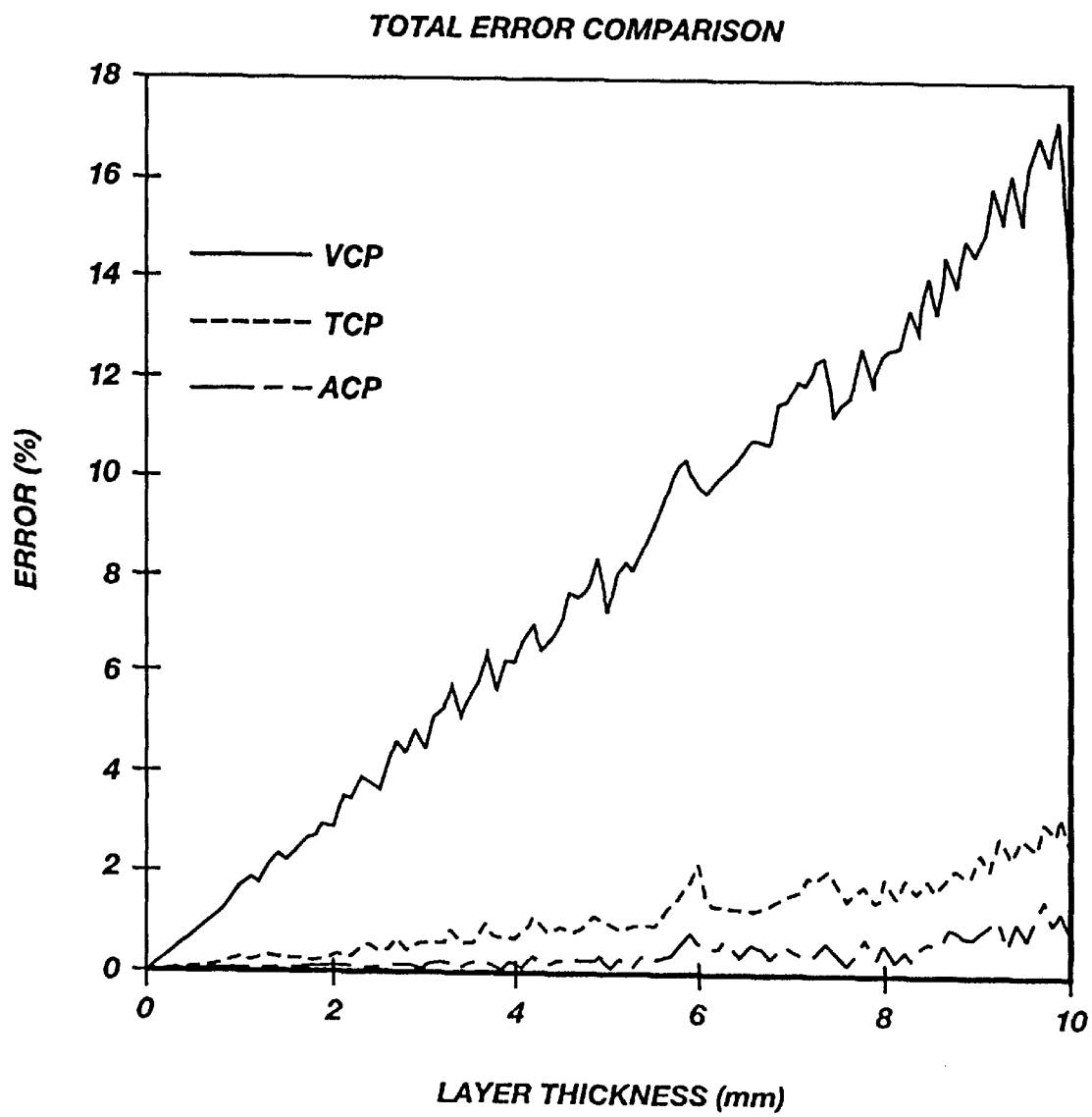
FIG. 10 is a plot of the percent error of surface fit the paradigms of FIGS. 7, 8 and 9 as a function of layer thickness.

The data from these calculations are plotted in FIG. 10. As expected, the error is small for any of the paradigms if the layer thickness is very small. As layer thickness increases, the accuracy decreases for each method. The error for VCP increases dramatically faster than the higher order algorithms, exceeding 15 percent error as the layer thickness approaches 1 cm. At 1 cm thickness, both higher order techniques perform at under three percent error.

EXAMPLE 2

Figures 11, 12:
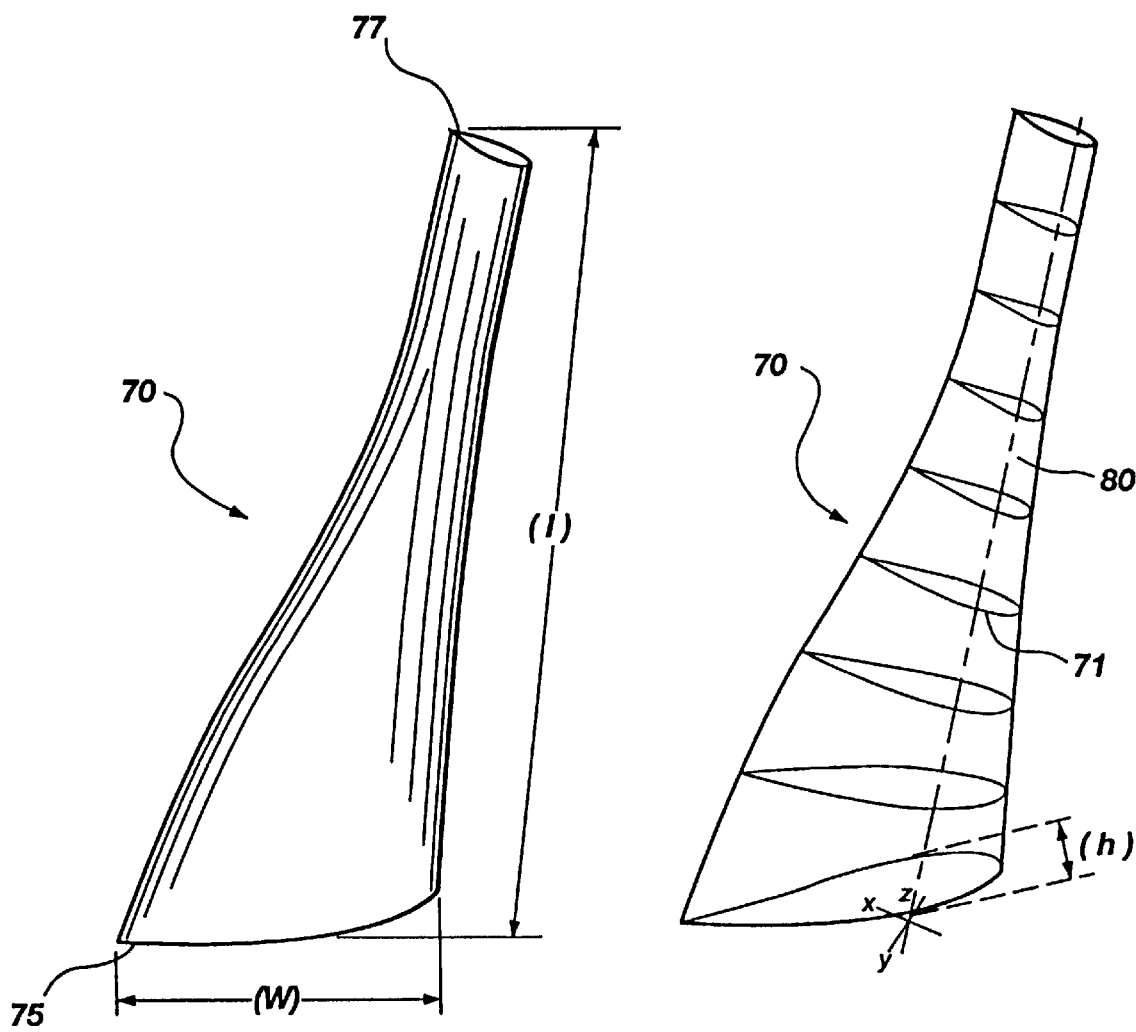
FIG. 11 is an illustration of an electronic model of an air foil.
FIG. 12 is an illustration of the model of FIG. 11 decomposed into electronic layers.
Figure 13:
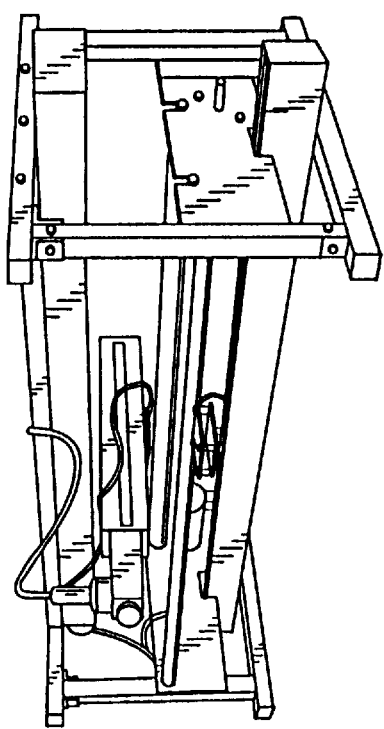
FIG. 13 is a pictorial view of an assembled machine incorporating the components illustrated by FIGS. 1, 2 and 3 for operation in accordance with the software of the appendix.

A computer generated model of a NASA LS(1)-417MOD wind turbine air foil 70 is shown in FIGS. 11 and 12. Construction of this air foil was attempted with good success using the equipment described in connection with FIGS. 1–4 assembled as illustrated by FIG. 13. The foil shape is described by a series of complex spline curves 71, which have a spline taper through the height (h) and width (w). The model is further complicated by a 42° angle of twist along the foil length (l). The total length of the model is 15 feet. The initial width (at the base 75) of the air foil is 46 inches, reducing to 10 inches at the tip 77. The height of the air foil starts at 7.81 inches at the base 75, reducing to 1.12 inches at the tip 77.

The computer model of the air foil was created using Parametric Technology's Pro/Engineer software. Spline points at various cross sections the air foil were generated from normalized data developed at NASA. These spline points were subsequently read into Pro/Engineer and series of spline curves were fit to the points as shown in FIG. 12. Smooth spline surfaces 80 were then generated between the spline curves 71. A computer solid model (FIG. 11) was created from the hollow spline shell. This computer solid model was stored as a standard stereolithography format file.

The equipment illustrated by FIG. 13 was used to cut out the 180 layers required to construct the air foil prototype, requiring approximately 17 sheets of 4'×8'×1" thick sheets of bead board foam. Each layer of foam was then manually registered and bonded.

The accuracy of this air foil prototype was in the range of 0.08 to 0.6% error, when compared to chord lengths in the computer model. This level of accuracy is considered acceptable, given the size of the prototype and the facet mesh size of the STL file. The surface finish of the model was fairly rough, because of the STL file approximation of the computer model. Further facet refinement of the STL file would correspondingly improve the surface finish.

The air foil computer model was created in approximately 2 hours using Pro/Engineer. Cut out and assembly time for the air foil prototype was estimated at 9 hours.

Reference in this disclosure to details of specific embodiments is not intended to limit the scope of the appended claims which themselves recite those details regarded as significant to the invention. It is intended for the appended claims to embrace equivalents.

What is claimed is:

1. In a rapid prototype system wherein an electronic model of an object is electronically decomposed into a first series of electronic layers, a second series of physical layers is generated from a construction material, said second series corresponding layer by layer to said first series, and a physical prototype of that object is then constructed by assembling said physical layers, the improvement which comprises:
    a. electronically decomposing said object into said first series of electronic layers in accordance with a paradigm characterized by a higher than zero order fit with respect to the surface of said object; and
    b. generating said second series of physical layers from said construction material by mechanical means constructed and arranged to operate in accordance with said paradigm.

2. An improvement according to claim 1 wherein said paradigm has a higher order of fit than that of the vertical cylinder paradigm (VCP).

3. An improvement according to claim 2, wherein said paradigm is selected from either the trapezoidal cylinder paradigm (TCP) or the arc cylinder paradigm (ACP).

4. An improvement according to claim 1, wherein said steps a and b are conducted by means controlled by software.

5. A rapid prototype system, comprising:
    electronically decomposing an electronic model of an object into a first series of electronic layers in accordance with a paradigm characterized by a higher than zero order fit with respect to the surface of said object;
    generating a second series of physical layers from a construction material by mechanical means constructed and arranged to operate in accordance with said paradigm, said second series corresponding layer by layer to said first series; and
    constructing a physical prototype of said object by assembling said physical layers.

6. A rapid prototype system according to claim 5, wherein said mechanical means is structured and arranged to provide four degrees of freedom in positioning a cutting device with respect to sheets of said construction material.

7. A rapid prototype system according to claim 6, wherein said mechanical means is constructed and arranged to accept and manipulate sheets of construction material four feet wide.

8. A rapid prototype system according to claim 6, wherein said mechanical means is operated by control means responsive to software.

9. A rapid prototype system according to claim 6, wherein said mechanical means includes:
    a support structure, operable to move a sheet of construction material forwards and backwards along a travel path in a plane;
    an electronically heated wire with a first end held by a first linear positioning device and a second end held by a second linear positioning device, said first and second positioning devices being supported to position said wire transverse said plane to intersect and cut a sheet of construction material traveling on said support structure;
    first structure, mounting said first positioning device such that it may travel back and forth transverse said travel path;
    second structure, mounting said second positioning device such that it may travel independently of said first positioning device back and forth transverse said travel path; and
    electronic control means, responsive to operating software, for controlling the relative movements of a sheet of construction material on said support structure, said first positioning means and said second positioning means.

10. A rapid prototype system according to claim 9, including heat control means, responsive to said operating software, constructed and arranged to adjust the temperature of said wire.

11. A method for producing a physical prototype from an electronic model of an object, comprising:
    electronically decomposing said model into a first series of electronic layers in accordance with a paradigm characterized by a higher than zero order fit with respect to the surface of said object;
    generating a second series of physical layers, corresponding layer by layer to said first series, from construction material by mechanical means constructed and arranged to operate in accordance with said paradigm; and
    assembling said second series of layers to form said physical prototype.

12. A method according to claim 11, wherein said mechanical means is constructed and arranged to accept and manipulate sheets of construction material in association with a cutting device.

13. A method according to claim 12, wherein said mechanical means is structured and arranged to provide four degrees of freedom in positioning said cutting device with respect to sheets of said construction material.

14. A method according to claim 12, wherein said mechanical means is operated by control means responsive to software.

* * * * *